R. B. STERNBERG AND W. W. WEBB.
LUBRICATOR.
APPLICATION FILED JULY 26, 1919.
1,389,227. Patented Aug. 30, 1921.
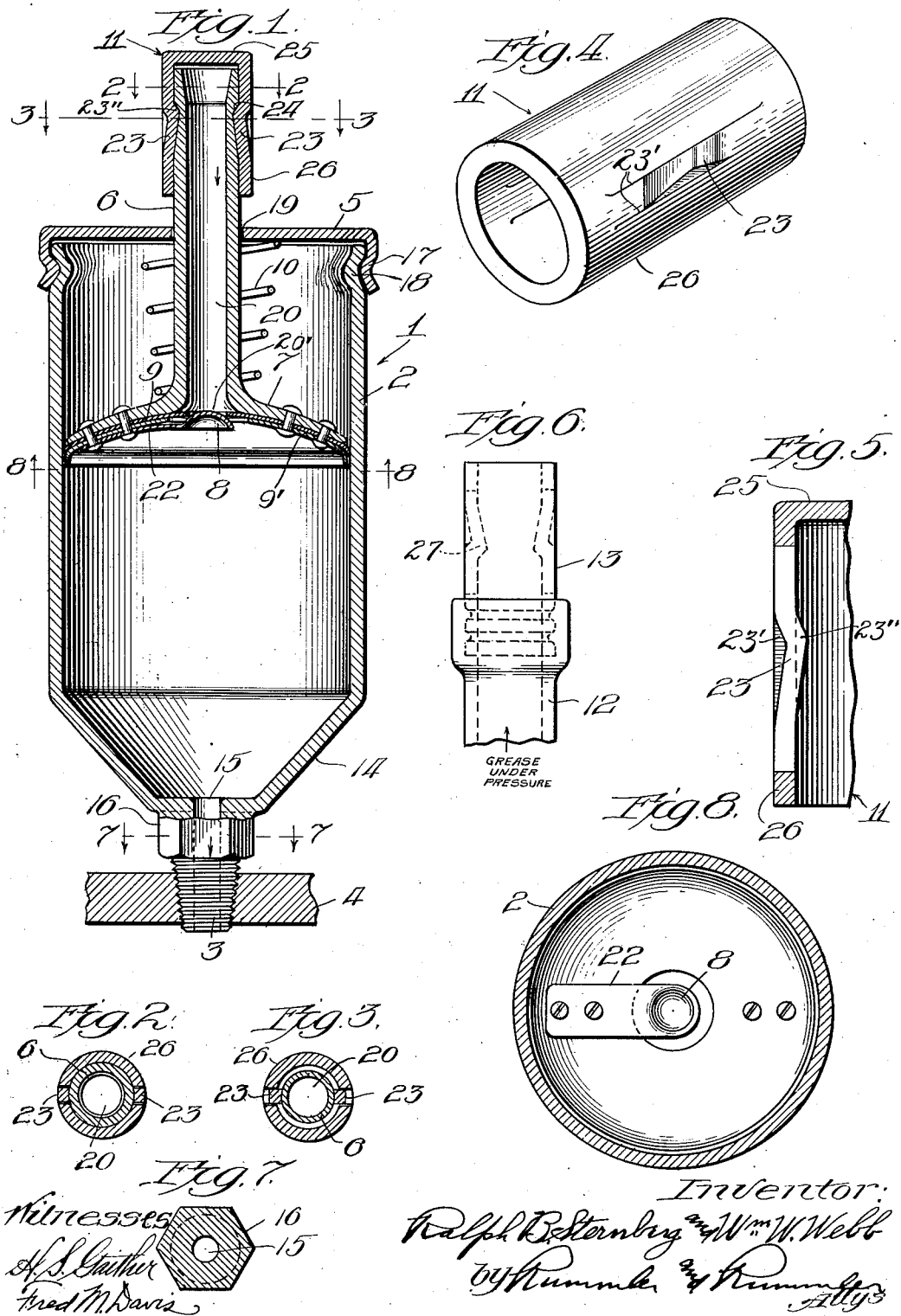

# UNITED STATES PATENT OFFICE.

RALPH B. STERNBERG AND WILLIAM W. WEBB, OF CHICAGO, ILLINOIS.

LUBRICATOR.

1,389,227.

Specification of Letters Patent.

Patented Aug. 30, 1921.

Application filed July 26, 1919. Serial No. 313,585.

*To all whom it may concern:*

Be it known that we, RALPH B. STERNBERG and WILLIAM W. WEBB, citizens of the United States of America, and residents of Chicago, county of Cook, and State of Illinois, have invented certain new and useful Improvements in Lubricators, of which the following is a specification.

This invention relates to grease cups of the compression type adapted for feeding grease or the like under pressure, and adapted for automatic filling from a suitable source also under pressure.

The main objects of this invention are to provide a cup of the character stated having an improved form of filling means and also an improved form of valve and arrangement thereof in connection with the grease inlet; to provide an improved form of closure for the inlet tube and corresponding connector on the supply means adapted for connection to said tube.

An illustrative embodiment of this invention is shown in the accompanying drawings, in which—

Figure 1 is an axial section of the grease cup.

Fig. 2 is a section on the line 2—2 of Fig. 1.

Fig. 3 is a section on the line 3—3 of Fig. 1.

Fig. 4 is a perspective view of the filler cap.

Fig. 5 is an enlarged fragmentary section thereof.

Fig. 6 is a side elevation of the discharge end of the supply tube.

Fig. 7 is a section on the line 7—7 of Fig. 1.

Fig. 8 is a section on the line 8—8 of Fig. 1.

In the construction shown in the drawings, the grease cup or lubricator 1 comprises a casing 2 having a nipple 3 adapted for detachably connecting the grease cup to the machine body or wall 4 threaded to receive said nipple, a container cap 5, an inlet tube 6 fitting slidably in said cap, a piston 7 on the inner end of said tube, a valve 8 mounted on said piston for induction of grease, packing or gasket means 9 for said piston, a protector 9' for the gasket 9, a spring 10 for urging the piston inward, and a cap 11 for closing the outer end of the inlet tube. Supply means are provided in the form of a flexible tube 12 leading to a source of grease under pressure or to a pump, as understood in the art, said tube being provided with a connector 13 formed and adapted for connection to the inlet tube in place of the filler cap 11.

The cup proper or casing 1 is of cylindrical shape somewhat conoidal at its lower end 14 where it is centrally apertured to provide a discharge opening 15 through the nut part 16 and nipple 3. The nut and nipple part 16—3 is preferably in the form of a casting fastened permanently in a unitary manner to casing 2, the lower end of which is spun into a restricted conoidal shape to form the bottom 14. The container cap 5 is provided with a downward flange 17 adapted to engage the upper edge 18 of the cup 2. The parts 17 and 18 are joined preferably in permanent relation, as by spinning or crimping the edges together tightly, sufficient to resist any maximum pressure of spring 10. Said cap 5 is centrally apertured at 19 to receive the inlet tube 6 in mutually slidable relation.

The piston head 7 is concavo-discoidal in shape, being somewhat dished, with its concave side facing downward. Said head is formed by expansive spinning of the lower end of tube 6 concentrically with the inlet passageway 20. The lower or compression side of the piston head 7 is provided with the packing or gasket 9 preferably in the form of a leather disk or the like perforated centrally in registry with the tube aperture 20 and disposed with its outer edge fitting snugly against the wall of the grease cup and turned downward. The ring 9' is secured to said piston adjacent to its outer edge to protect the underside and edge of member 9. The outer rim of ring 9' is curved downward so as to bear on the bottom 14 when the piston is lowered.

The valve 8 is somewhat spoon-shape and comprises a resilient stem 22 on which the dished valve proper 8 is supported in operative relation to the port 20' so as to fit tightly against the inner edges of the packing 9 when subjected to the pressure of grease contained in the cup.

The spring 12, whereby pressure is maintained in the grease cup, is in the form of a spiral disposed with one end against the underside of the cap 5 and with its other end disposed against the upper side of the piston head 7. The filler cap 11 is formed to provide a tight closure for the upper end of tube 6 and is provided with yielding retainer means preferably in the form of a pair of inwardly bowed vertical strips 23 formed by making a pair of slits 23' and providing inward humps 23" to yieldingly engage the downwardly facing annular shoulder 24 formed on the exterior of tube 6. Said cap comprises a flat top 25 with a downward cylindrical flange 26 from which the latches 23 are struck, as will be understood in the art.

The connector 13 of the filling tube, is formed similar to the cap 11 except that it lacks the transverse end part 25 and is secured to the tube 12 at the end opposite from the latch members 27.

Although a spun connection is preferred for the flanges 17 and 18, it is to be understood that this connection may be made by sweating, spot-welding or otherwise as will be understood.

The operation of the device is as follows: When the cup is to be filled, the cap 5 is pulled off and the filling tube attached in place of the cap by thrusting the connector 13 down over the end of tube 6 whereupon the latches 27 yieldingly engage the shoulder 24 in the same manner that the cap 11 is secured by the yielding latches 23". Grease is then forced through the tube 12 into the inlet 6 through the port 20' past the valve 8 and into the cup chamber. As the cup becomes filled, the piston head 7 is raised by the pressure of the grease until the cup is filled. The connector 13 is then removed and the cap is replaced. The valve 8 prevents any leakage of grease back through the tube 6 regardless of any closure at the outer end of said tube. The cap 11, however, serves to keep out dust and protects the exposed end of the tube 6.

As the grease is gradually discharged through the aperture 15, the spring 10 forces the piston 7 downward and so maintains a substantially uniform pressure on the grease. The position of the tube 6 indicates the amount of grease remaining in the cup 2.

Although but one specific embodiment of this invention has been herein shown and described, it will be understood that numerous details of the construction shown may be altered or omitted without departing from the spirit of this invention as defined by the following claims.

We claim:

1. A grease cup, comprising a casing adapted to hold grease, means for mounting said casing through which to discharge the grease, a piston fitting operatively within said casing, resilient means urging said piston to expel the grease through said means, said piston having a port and a laterally supported inwardly opening spring closure induction valve therefor, and an inlet tube secured to said piston and communicating with said port.

2. A grease cup, comprising a cylindrical casing provided with inlet means at one end and discharge means at the opposite end, a piston operatively disposed in said casing, resilient means to urge said piston continuously toward the discharge means, said inlet means being connected to said piston, a valve being provided for inward opening on the inner side of the movable member in operative relation to the inlet means for admitting grease and preventing its discharge through the inlet means, said valve having a laterally extending leaf spring support secured remotely from the valve body proper to said piston and urging said valve toward its port.

3. A grease cup having an inlet tube projecting therefrom, the outer end of said tube having an annular shoulder on its exterior facing toward said cup, and a cap fitting said tube and having yielding latch means of resilient character adapted to automatically engage said shoulder for securing said cap in place.

4. In a grease cup of the character described, a combination piston and hollow rod of integral character, said piston having a central port coaxial and communicating with the passageway in said rod, and a valve seated normally against the inner side of said port, said valve having a laterally disposed resilient stem secured to the outer part of said piston on the inner face of the latter.

Signed at Chicago this 16 day of July, 1919.

RALPH B. STERNBERG.
WILLIAM W. WEBB.